United States Patent [19]
Bergano et al.

[11] Patent Number: 5,345,331
[45] Date of Patent: Sep. 6, 1994

[54] TECHNIQUE FOR REDUCING POLARIZATION DEPENDENT GAIN IN AN AMPLIFIED OPTICAL TRANSMISSION SYSTEM

[75] Inventors: Neal S. Bergano, Lincroft; Vincent J. Mazurczyk, Manalapan; John L. Zyskind, Shrewsbury, all of N.J.

[73] Assignee: AT&T Bell Laboratories, Murray Hill, N.J.

[21] Appl. No.: 46,536

[22] Filed: Apr. 13, 1993

[51] Int. Cl.$^5$ .............................. H04B 10/02
[52] U.S. Cl. .................... 359/341; 359/337; 359/174
[58] Field of Search .............. 359/337, 341, 174

[56] References Cited

U.S. PATENT DOCUMENTS

| | | | |
|---|---|---|---|
| 4,507,785 | 3/1986 | Richards | 372/12 |
| 4,556,293 | 12/1985 | Burns et al. | 350/400 |
| 4,735,489 | 4/1988 | Tolksdorf et al. | 350/377 |
| 4,822,150 | 4/1989 | Duarte | 350/394 |
| 5,075,893 | 12/1991 | Epstein et al. | 372/108 |
| 5,117,196 | 5/1992 | Epworth et al. | 359/174 X |
| 5,140,654 | 8/1992 | Akasaka et al. | 385/8 |

OTHER PUBLICATIONS

"Spectral and Polarization Hole Burning in Neodymium Glass Lasers" D. W. Hall et al. IEEE J. of Quantum Electronics, vol. QE-19, No. 11, Nov. 1983. pp. 1704-1717.

"Polarization Effects on Single-Mode Optical Fiber Sensors", S. K. Sheem et al. Appl. Phyls. Lett. vol. 35, No. 12, Dec. 15, 1979, pp. 914-917.

"Observation of New Polarization Dependence Effect in Long Haul Optically Amplified System" M. G. Taylor, OFC'93 Post-deadline paper, Feb. 1993, pp. 23-28.

"Spectral Gain Hole-Burning at 1.53 m in Erbium-Doped Fiber Amplifiers" E. Desurvire, et al. IEEE Photonics Tech. Lett., vol. 2, No. 4, Apr. 1990, pp. 246-248.

"Polarized Fluorescence Line Narrowing Measurements of Nd Laser Glasses: Evidence of Stimulated Emission Cross Section Anisotropy" D. W. Hall and M. J. Weber Appl. Phyl. Lett., vol. 42, No. 2, Jan. 15, 1983, pp. 157-159.

*Primary Examiner*—Mark Hellner
*Attorney, Agent, or Firm*—Robert P. Marley

[57] ABSTRACT

A technique employing a depolarized optical source to reduce the polarization dependent gain associated with the optical pump signal used to excite doped fiber amplifiers within an optical transmission system. Pumping the doped fiber amplifiers with a signal that has no single predominant linear SOP, equalizes the gain of the amplifiers. A particular embodiment of the invention includes a pump comprised of a passive polarization scrambler coupled to the output of a multifrequency optical laser. The simple, passive arrangement keeps overall system costs to a minimum and increases reliability.

13 Claims, 2 Drawing Sheets

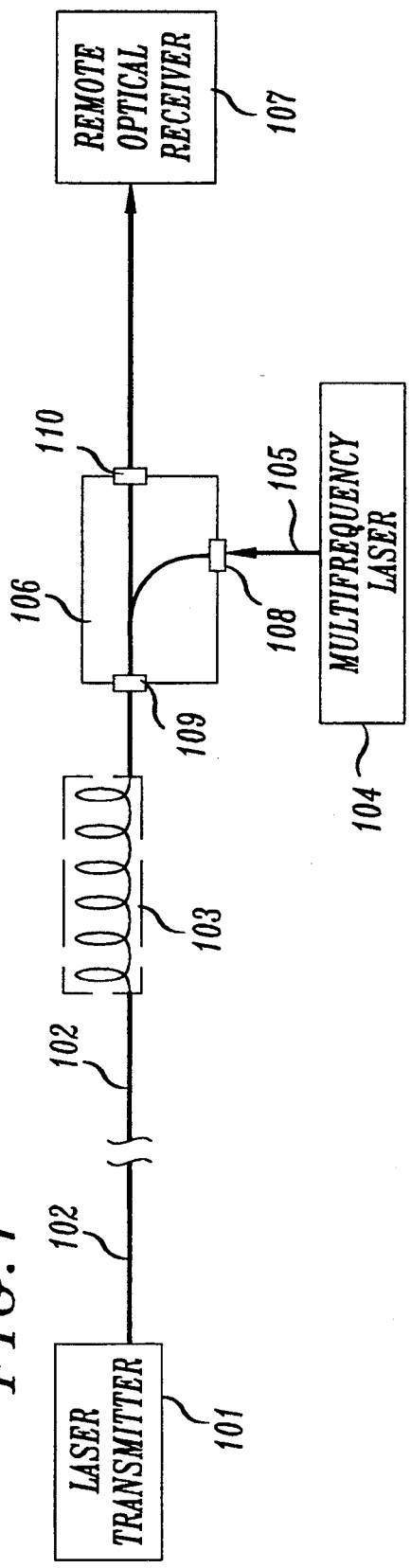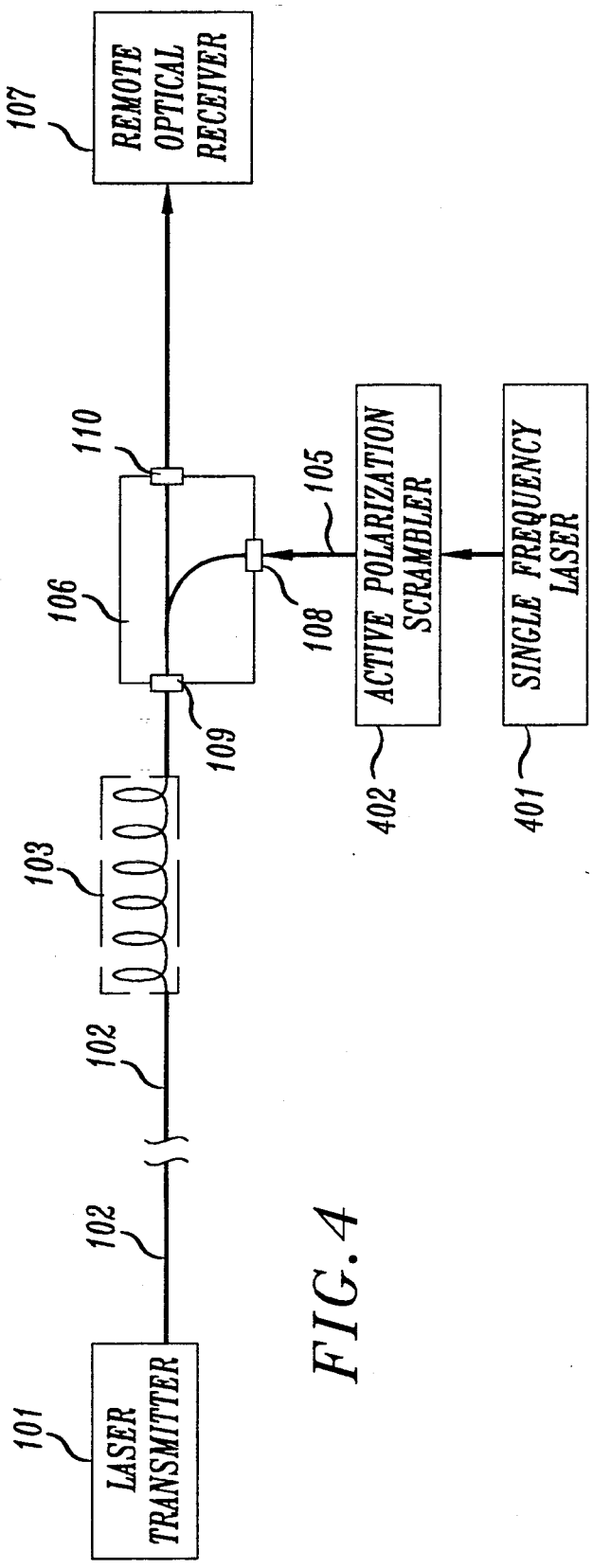

TECHNIQUE FOR REDUCING POLARIZATION DEPENDENT GAIN IN AN AMPLIFIED OPTICAL TRANSMISSION SYSTEM

TECHNICAL FIELD

The invention relates to systems for the optical transmission of information, more particularly, to an improved optical pumping technique for such systems.

BACKGROUND OF THE INVENTION

Very long optical fiber transmission paths, such as those employed in undersea or trans-continental terrestrial lightwave transmission systems that employ optical amplifier repeaters, are subject to decreased performance due to a host of impairments that increase as a function of the length of the optical fiber comprising the transmission path. Typically, in such long optical transmission systems, these impairments vary with time and cause a random fluctuation in the signal-to-noise ratio ("SNR") of the transmission path. This random fluctuation contributes to a phenomenon known as signal fading. Signal fading can result in an increased bit error rate ("BER") for digital signals transmitted via the optical fiber path. When the SNR of a digital signal within such a transmission system becomes unacceptably small (resulting in an undesirably high BER), a signal fade is said to have occurred. Experimental evidence has shown that signal fading and SNR fluctuations are caused by several polarization dependent effects induced by the optical fiber itself and/or other optical components (e.g., repeaters, amplifiers, etc.) along the transmission path. In general, these effects result from the anisotropic transmission characteristics of the optical components and fiber within a transmission system. For example, anisotropic loss or gain as a function of signal polarization.

Doped fiber amplifiers (such as the erbium-doped fiber amplifiers typically employed as repeaters within long-haul optical fiber transmission systems) can exhibit anisotropic gain as signal polarization is varied. This is a newly identified mechanism of transmission anisotropy called polarization dependent gain ("PDG"). PDG has two components; one is associated with the signal passing through the doped fiber amplifier, and the other with the optical pump signal used to excite the doped fiber amplifier. To distinguish between these two, the latter is designated $PDG_{PUMP}$. $PDG_{PUMP}$ is the active component counterpart to polarization dependent loss ("PDL"), a well-known phenomenon that causes anisotropic losses within passive components. $PDG_{PUMP}$ arises from the random orientation of dopant ions within the glass matrix of the fiber amplifier, and the selective excitation of these ions by a linearly polarized pump laser. The gain of the doped fiber amplifier induced by this pumping is larger for signals having a linear state of polarization ("SOP") parallel to the SOP of a linearly polarized pumping signal. Ideally, all $PDG_{PUMP}$ should be removed from paths within optical transmission systems to achieve optimum performance. Unfortunately, standard techniques used to remove or reduce PDL in passive system components prove ineffective in eliminating $PDG_{PUMP}$.

SUMMARY OF THE INVENTION

The present invention effectively neutralizes $PDG_{PUMP}$ within amplified optical transmission systems by employing optical pump sources which produce signals having a low degree of linear polarization to pump doped fiber amplifiers within the system. Pumping the doped fiber amplifiers with a signal that has no single predominant linear SOP, equalizes the gain of the amplifiers. A particular embodiment of the invention includes a pump comprised of a passive polarization scrambler coupled to the output of a multifrequency optical laser. The simple, passive arrangement keeps overall system costs to a minimum and increases reliability.

BRIEF DESCRIPTION OF THE DRAWING

In the drawing:

FIG. 1 shows, in simplified form, an optical transmission system, including a passive polarization scrambler which facilitates the practice of the invention;

FIG. 4 shows, in simplified form, an optical transmission system, including an active polarization scrambler which facilitates the practice of the invention.

DETAILED DESCRIPTION OF THE INVENTION

Figure 2:
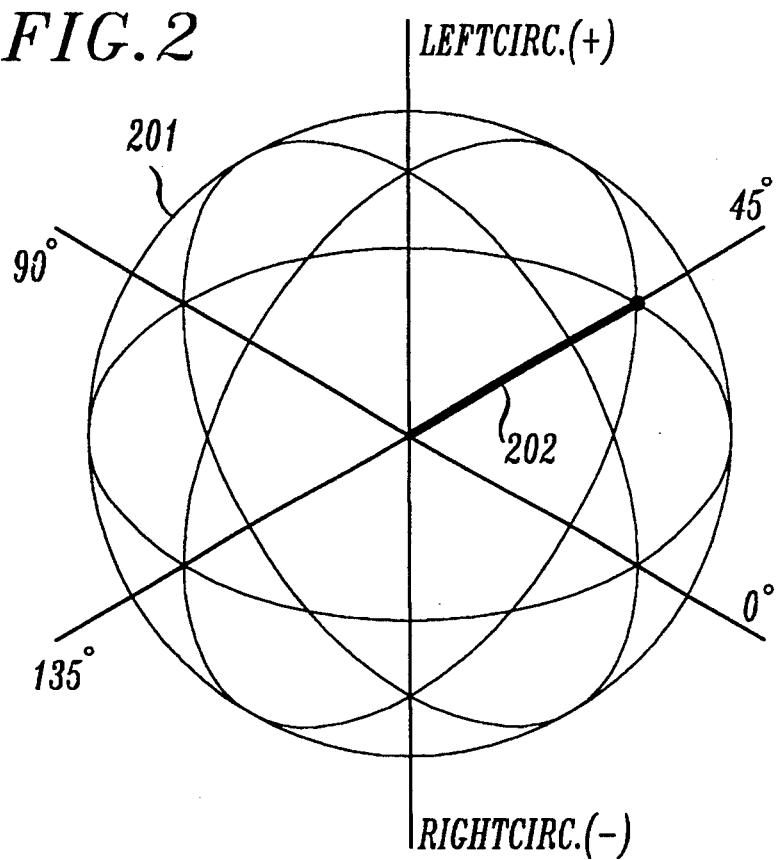
FIG. 2 is a graphical representation of the SOP of the output signals produced by multifrequency pump laser 104 of FIG. 1.

FIG. 1 shows a simplified diagram of an optical transmission system facilitating the practice of the invention. As shown, the system includes laser transmitter 101, very long single-mode optical fiber 102, doped fiber amplifier 103, multifrequency pump laser 104, high-birefringence fiber ("HiBi fiber") 105, wavelength division multiplexer ("WDM") 106, and remote optical receiver 107. Laser transmitter 101 produces an encoded optical signal of wavelength $\lambda_1$. This encoded signal is routed through very long single-mode optical fiber 102 for transmission to remote receiver 107. Doped fiber amplifier 103 serves as a repeater amplifier for the encoded optical signals traveling upon single-mode optical fiber 102.

Multifrequency pump laser 104 generates optical signals, having wavelengths between $\lambda_2$ and $\lambda_3$, which pump doped fiber amplifier 103. These pumping signals are routed to doped fiber amplifier 103 via HiBi fiber 105 and WDM 106. WDM 106 is a standard wavelength division multiplexer. It permits the pumping signals from HiBi fiber 105 to enter through port 108 to exit via port 109, and allows only the $\lambda_1$ optical signal (which is outside the $\lambda_2$–$\lambda_3$ range) to propagate between ports 109 and 110.

Multifrequency pump laser 104 is fabricated so that it generates linearly polarized optical signals having a particular SOP. All of the optical signals generated by multifrequency pump laser 104, regardless of frequency, will share the same linear SOP. HiBi fiber 105 is coupled to the output of multifrequency pump laser 104 so that its two orthogonally-oriented birefringence axes are angularly offset from the SOP of the output of multifrequency pump laser 104. As is known in the art, a linearly polarized optical signal angularly offset from a fiber's birefringent axes will undergo a certain differential phase delay as it propagates along the fiber. The amount of phase delay introduced by the HiBi fiber depends upon the wavelength of the optical signal, birefringence parameters of the individual fiber, the length of the HiBi fiber, the angular offset between the SOP of the optical signal, and orientation of the birefringent axes of the HiBi fiber.

The radial orientation of HiBi fiber 105 is fixed so that the SOP of the optical signals output by multifrequency pump laser 104 are offset by 45° from the HiBi fiber's birefringent axes. In practicing the invention within an optical transmission system, it is advantageous to insure a 45° offset between the SOP of the input optical signals and the birefringent axes of the HiBi fiber. This 45° offset causes the power of the input optical signals to be distributed equally between the HiBi fiber's two birefringent axes. Equal power distribution between the axes allows for optimal polarization scrambling of the optical signals over the length of the HiBi fiber.

Since the optical signals output by multifrequency laser are launched at a 45° angle with respect to the birefringence axes of HiBi fiber 105, the SOPs of the signals will precess about a great circle on a Poincaré sphere. The rate of precession for each optical signal is dependent upon wavelength as follows:

$$\text{Precession Rate} = \frac{2\pi (PMD) c}{\lambda_i} \text{ radians/meter;}$$

where $\lambda_1$ is the wavelength of the individual signal, PMD is the polarization-mode dispersion of HiBi fiber 105, and c is the speed of light. Each signal generated by multifrequency pump laser 104 has a slightly different wavelength, and thus the rotation rate for each signal will be slightly different. The angular separation of each signal at the output of HiBi fiber 105 is given by:

$$2\pi \Delta v_s (PMD) L \text{ radians;}$$

where $\Delta v_s$ is the frequency separation between the various generated optical signals, L is the length of HiBi fiber 105, and PMD is the polarization-mode dispersion of HiBi fiber 105.

Assuming the optical power of multifrequency pump laser is equally distributed among the various frequency generated optical signals, the signals exiting HiBi fiber 105 will have a uniform distribution of SOPs on a great circle upon the Poincaré sphere if the length ("L") of HiBi fiber 105 is fixed at:

$$L = \frac{1}{N \Delta v_s (PMD)};$$

where $N \geq 2$. In the above equation N is the number of longitudinal modes produced by multifrequency pump laser 104, and PMD is the polarization mode dispersion of HiBi fiber 105. In other words, the overall signal exiting from HiBi fiber 105 will exhibit no particular linear polarization. However, to avoid the detrimental effects of $PDG_{PUMP}$ the polarization scrambling need not result in a truly nonpolarized signal. Rather, the scrambled signal's degree of linear polarization need only be decreased to a point where $PDG_{PUMP}$ induced by the signal fails to detrimentally effect the gain characteristics of doped fiber amplifier being pumped.

Figure 3:
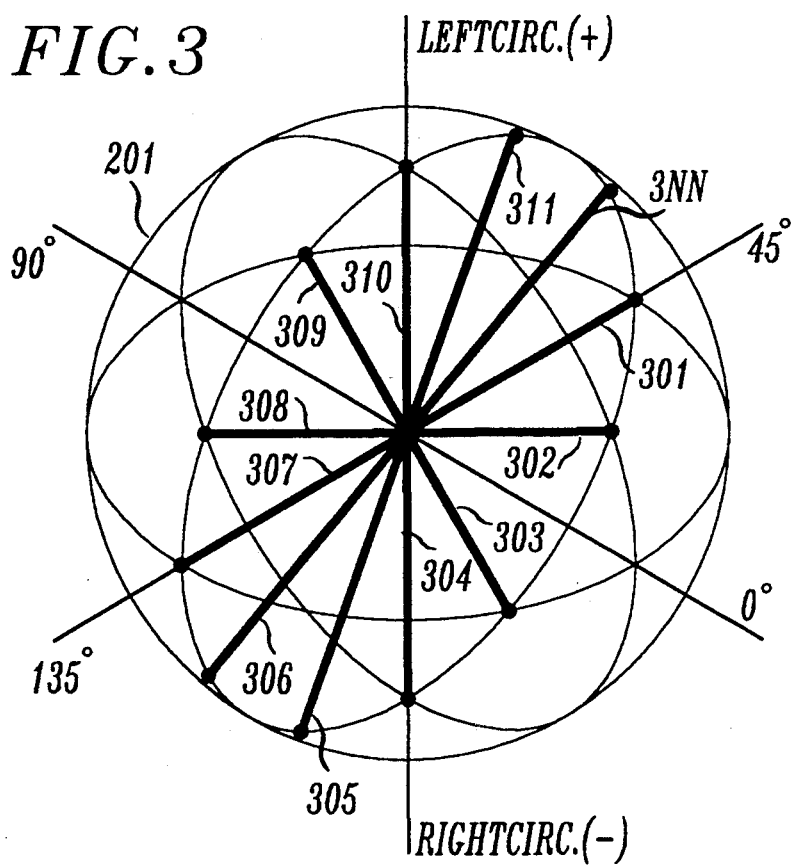
FIG. 3 is a graphical representation of the SOP of the signals exiting high-birefringence fiber 105 of FIG. 1.

A graphical representation of the polarization scrambling provided by HiBi fiber 105 is provided in FIGS. 2 and 3. In each of these representations, a point on Poincaré sphere 201 represents a particular SOP. The radius connecting the center of Poincaré sphere 201 and a point on the sphere is a Stoke vector. The SOP of the optical signals produced multifrequency pump laser 104 (FIG. 1) is represented by Stoke vector 202 in FIG. 2.

In FIG. 3, Stoke vectors 301 through 3NN represent the various SOPs for the different optical frequency signals (i.e., longitudinal modes) exiting from HiBi fiber 105 (FIG. 1). NN represents the total number of longitudinal modes generated by multifrequency pump laser 104 (FIG. 1).

The scrambled optical pump signal output from HiBi fiber 105 is coupled, via WDM 106, to pump doped fiber amplifier 103. Since the optical pump signal has no single predominant linear SOP, $PDG_{PUMP}$ is eliminated, along with any detrimental $PDG_{PUMP}$-related effects upon the gain characteristics exhibited by doped fiber amplifier 103.

If the distribution of the optical power produced by multifrequency laser 104 was not uniform over the range $\lambda_2$ to $\lambda_3$, then HiBi fiber 105 could be chosen to have PMD characteristics which would minimize the overall degree of polarization of the particular signals produced by multifrequency laser 104. For example, if multifrequency laser 104 produced most of its optical power in two particular modes, a HiBi fiber could be employed which would cause these two modes to exit the fiber having orthogonally oriented SOPs.

FIG. 4 shows a simplified diagram of a second optical transmission system that facilitates the practice of the invention. The illustrated system includes laser transmitter 101, very long single-mode optical fiber 102, doped fiber amplifier 103, single-frequency laser 401, active polarization scrambler 402, wavelength division multiplexer ("WDM") 106, and remote optical receiver 107.

The operation of this system is very similar to that illustrated in FIG. 1. Laser transmitter 401 produces an encoded optical signal of wavelength $\lambda_1$. The encoded signal is routed through very long single-mode optical fiber 102 for transmission to remote receiver 107. Doped fiber amplifier 103 serves as a repeater amplifier for the encoded optical signals traveling upon single-mode optical fiber 102. Single-frequency laser 401 generates an optical signal having a wavelength of $\lambda_2$, which pumps doped fiber amplifier 103. This pumping signal is routed to doped fiber amplifier 103 via WDM 106. WDM 106 permits the pumping signal to enter through port 108 to exit via port 109, and allows only the $\lambda_1$ optical signal to propagate between ports 109 and 110.

As with the system of FIG. 1, the optical pump signal's degree of linear polarization is reduced prior to the pump signal entering WDM 106. However, laser 401 produces a single-frequency optical signal, which cannot be passively depolarized by transmission through a length of HiBi fiber. Consequently, the output of single-frequency laser 401 is routed through active polarization scrambler 402 before being input to WDM 106. The depolarized, single-frequency pump optical signal output by active polarization scrambler 402 is coupled, via WDM 106, to pump doped fiber amplifier 103. Since the optical pump signal has no single predominant SOP, $PDG_{PUMP}$ and unwanted $PDG_{PUMP}$-related gain effects upon the gain characteristics of doped fiber amplifier 103 are eliminated.

Various active polarization scramblers are known in the art, including rotating waveplates, and mechanical arrangements that apply cyclic stresses to optical fibers (thereby varying the effective birefringence of the stressed optical fiber and, causing a shift in the polarization of the optical signal being transmitted). The particular method of actively scrambling the polarization of the signal output by single-frequency laser 401 is not critical, so long as the resulting signal exhibits no net average linear polarization over the interval of time required for $PDG_{PUMP}$ to build-up and adversely affect the gain of doped fiber amplifier 103.

It will be understood that the particular embodiments described above are only illustrative of the principles of the present invention, and that various modifications could be made by those skilled in the art without departing from the scope and spirit of the present invention, which is limited only by the claims that follow. One such modification would include employing a superluminescent diode as the multifrequency optical source for the invention. Such diodes produce a high number of longitudinal modes, and as a result, allow for an increased degree of polarization scrambling for a given length of HiBi fiber. Another modification would include employing an integrated opto-electronic polarization modulator (such as a lithium niobate device) to effect the active scrambling of the optical pump signal.

We claim:

1. A method for reducing the effects of polarization dependent gain within an optical transmission system employing a doped fiber amplifier, comprising the steps of:
   generating an optical pump signal, via passive polarization scrambling of a polarized optical signal, having a degree of linear polarization below that which would induce said doped fiber amplifier to exhibit a detrimental polarization dependent gain in response to the application of a polarized optical pump signal;
   exciting said doped fiber amplifier with said generated optical pump signal to induce a polarization-equalized gain characteristic.

2. A method for reducing the effects of polarization dependent gain within an optical transmission system employing a doped fiber amplifier, comprising the steps of:
   generating an optical pump signal, via active polarization scrambling of a polarized optical signal, having a degree of linear polarization below that which would induce said doped fiber amplifier to exhibit a detrimental polarization dependent gain in response to the application of a polarized optical pump signal;
   exciting said doped fiber amplifier with said generated optical pump signal to induce a polarization-equalized gain characteristic.

3. A method for reducing the effects of polarization dependent gain within an optical transmission system employing a doped fiber amplifier, comprising the steps of:
   generating an optical pump signal which exhibits no net average linear polarization over the interval of time required for said doped fiber amplifier to exhibit a detrimental polarization dependent gain in response to the application of a polarized optical pump signal;
   exciting said doped fiber amplifier with said generated optical pump signal to induce a polarization-equalized gain characteristic.

4. The method of claim 3 wherein said step of generating an optical pump signal is accomplished via passive polarization scrambling of a polarized optical signal.

5. The method of claim 3 wherein said step of generating an optical pump signal is accomplished via active polarization scrambling of a polarized optical signal.

6. An apparatus for reducing the effects of polarization dependent gain within an optical transmission system employing a doped fiber amplifier, comprising:
   an optical source adapted to simultaneously generate a plurality N of linearly polarized optical pump signals over a range of frequencies, all of said generated optical pump signals sharing the same state of polarization; and
   an optical transmission path optically coupling the output of said optical source and said doped fiber amplifier, said optical transmission path including a fixed length L of birefringent fiber oriented so that the states of polarization of said linearly polarized optical pump signals generated by said optical source are propagated along said birefringent optical fiber at an angle of 45° with respect to the birefringent axes of said birefringent fiber, said length L being equal to:

$$\frac{1}{N\Delta\nu_s(PMD)},$$

where N is an integer greater than or equal to 2, $\Delta\nu_s$ is the wavelength separation between the linearly polarized optical pump signals generated by said optical source, and PMD is the polarization mode dispersion of said birefringent optical fiber.

7. The invention of claim 6 wherein said optical source is a multifrequency laser.

8. The invention of claim 6 wherein said optical source is a super-luminescent diode.

9. A method for reducing the effects of polarization dependent gain within an optical transmission system employing a doped fiber amplifier, comprising the steps of:
   simultaneously generating a plurality of linearly polarized optical pump signals over a range of frequencies, all of which share the same state of polarization;
   launching said generated plurality of linearly polarized optical pump signals into a fixed length L of birefringent optical fiber optically so that the states of polarization of said launched linearly polarized optical pump signals are aligned at an angle of 45° with respect to the birefringent axes of said birefringent fiber, said fixed length L being equal to:

$$\frac{1}{N\Delta\nu_s(PMD)},$$

where N is an integer greater than or equal to 2, $\Delta\nu_s$ is the wavelength separation between the linearly polarized optical pump signals generated by said optical source, and PMD is the polarization mode dispersion of said birefringent optical fiber; and
   pumping said doped fiber amplifier with the signal exiting from said length L of birefringent optical fiber.

10. An apparatus for reducing the effects of polarization dependent gain within an optical transmission system employing a doped fiber amplifier, comprising:
   an optical source adapted to generate a single-frequency optical pump signal;

an optical transmission path optically coupling the output of said optical source and said doped fiber amplifier, said optical transmission path including an active polarization scrambler adapted to depolarize said single-frequency optical pump signal so that it exhibits no net average linear polarization over the interval of time required for said doped fiber amplifier to exhibit a detrimental polarization dependent gain characteristic in response to the application of a polarized optical pump signal.

11. The invention of claim 10 wherein said optical source is a single-frequency laser.

12. The invention of claim 10 wherein said active polarization scrambler includes means for transmitting said single frequency optical pump signal through a birefringent optical fiber, and means for mechanically stressing said birefringent optical fiber to vary the state of polarization of said single-frequency optical pump signal.

13. The invention of claim 10 wherein said active polarization scrambler includes means for transmitting said single frequency optical pump signal through an optical waveplate assembly, and means for rotating said optical waveplate assembly to vary the state of polarization of said single-frequency optical pump signal.

* * * * *